UNITED STATES PATENT OFFICE.

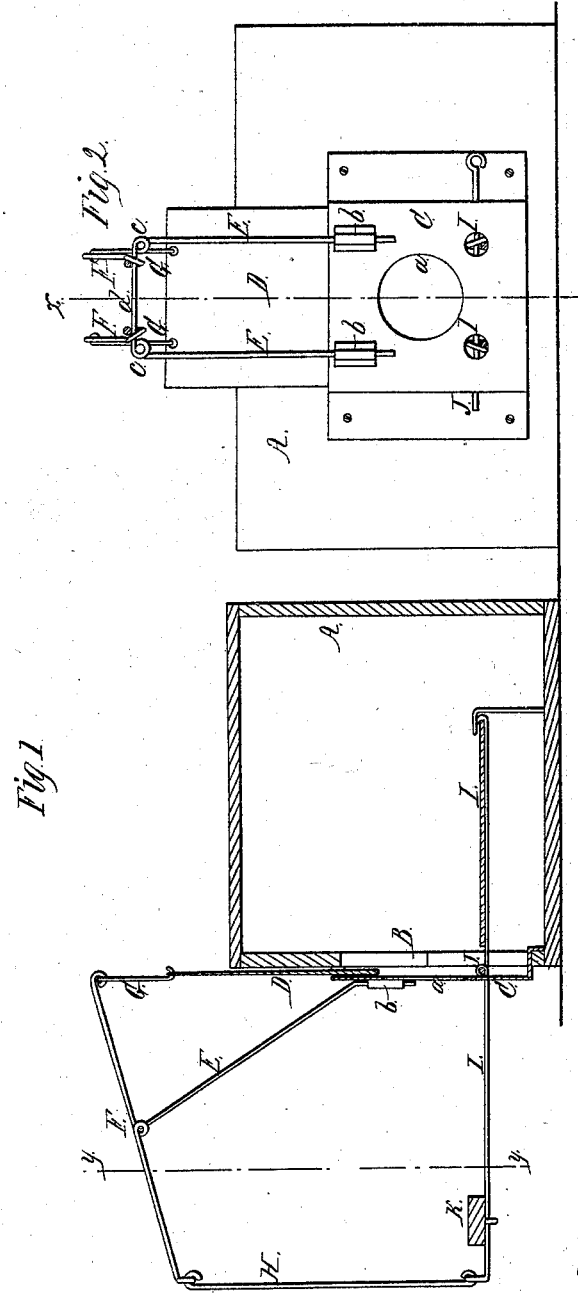

J. W. CHURCHILL, OF PITTSTON, PENNSYLVANIA.

IMPROVEMENT IN ANIMAL-TRAPS.

Specification forming part of Letters Patent No. 49,378, dated August 15, 1865.

*To all whom it may concern:*

Be it known that I, J. W. CHURCHILL, of Pittston, in the county of Luzerne and State of Pennsylvania, have invented a new and Improved Rat and Mouse Trap; and I do hereby declare that the following is a full, clear, and exact description thereof, which will enable others skilled in the art to make and use the same, reference being had to the accompanying drawings, forming part of this specification, in which—

Figure 1 is a vertical section of my invention, taken in the line $xx$, Fig. 2: Fig. 2, a vertical section of the same, taken in the line $yy$, Fig. 1.

Similar letters of reference indicate like parts.

This invention consists in providing a rat and mouse trap with a door, arranged in such a manner that it will remain open at all times, whether an animal is in or out of the trap, but will close whenever an animal attempts to get out of the same.

The object of the invention is to obtain a simple and efficient trap, which will always be "set," and will not be liable to get out of repair.

A represents a box, which may be of rectangular or other proper form, and having an opening, B, in one side of it.

C is a plate, which is placed in front of the opening B, with a space between the plate and the side of the box of sufficient width to allow a door, D, to slide freely up and down. The plate C has an opening, $a$, made in it of sufficient capacity to admit of a rat or mouse passing through it.

E E represent two inclined rods or bars, the lower ends of which are fitted in sockets $b\ b$ on the plate C. These rods E E may be formed of one piece of wire bent to form three sides of a quadrangle, with a loop, $c$, at each angle. (See Fig. 2.) The rods form a support for two rods, F F, the inner ends of which are connected by links G G with the door D, and the outer ends connected by a rod, H, with a treadle-frame composed of two rods, I I, which may be formed of a single piece of wire, if desired. The rods F F are bent around the horizontal part $d$ of the piece of wire of which the rods E E are formed, and are allowed to work freely thereon, and the rods I I are bent around a rod, J, which is in the lower part of the space between the plate C and the side of the box A, the rods I I extending within the box and having a platform, I*, upon them. The rods I I have a weight, K, upon them to serve as a counterpoise and keep the door D elevated when no weight is upon them.

From the above description it will be seen that an animal in passing upon the rods I I, and thence through the opening $a$ in the plate C, and into the box A upon the platform I*, will, when upon the platform, close the door D, the weight of the animal effecting that result. When the animal leaps from the platform down into the box A the door D will of course rise, but the animal cannot escape from the box, for as soon as he leaps upon the platform the door D instantly closes.

Thus it will be seen that a very simple and efficient self-setting trap is obtained, and one that will not be liable to get out of repair or become deranged by use.

For transportation the rods E E and I I may be detached from the box, the platform I* removed, and all the parts connected with the door-operating mechanism compactly folded.

Having thus described my invention, I claim as new and desire to secure by Letters Patent—

The combination of the counterbalanced platform-bar I I*, gate D, and their rod and lever connections, operating in combination with the platform, stop, and the box A, as and for the purpose described.

J. W. CHURCHILL.

Witnesses:
 J. E. RICHMOND,
 THOMAS STERN.